United States Patent
Kee et al.

[11] 3,897,673
[45] Aug. 5, 1975

[54] NUCLEAR FUEL PELLET LOADING MACHINE

[75] Inventors: Robert W. Kee, Gibsonia; John V. Denero, Leechburg, both of Pa.

[73] Assignee: Westinghouse Electric Corporation, Pittsburgh, Pa.

[22] Filed: Aug. 3, 1973

[21] Appl. No.: 385,527

[52] U.S. Cl. ............... 53/61; 53/246; 53/252
[51] Int. Cl. ............................................. B65b 57/10
[58] Field of Search ....... 53/61, 148, 236, 244, 246, 53/252

[56] References Cited
UNITED STATES PATENTS

| | | | |
|---|---|---|---|
| 2,019,080 | 10/1935 | Johnson et al. | 53/252 X |
| 3,456,425 | 7/1969 | Pezza | 53/236 |
| 3,576,189 | 4/1971 | Lorenz | 53/236 X |
| 3,708,947 | 1/1973 | Green et al. | 53/61 X |

Primary Examiner—Travis S. McGehee
Attorney, Agent, or Firm—J. R. Campbell

[57] ABSTRACT

Apparatus for loading nuclear fuel pellets on trays for transfer in a system. A conveyor supplies pellets from a source to a loading station. When the pellets reach a predetermined position at the loading station, a manual or automatically operated arm pushes the pellets into slots on a tray and this process is repeated until pellet sensing switches detect that the tray is full. Thereupon, the tray is lowered onto a belt or other type conveyor and transferred to other apparatus in the system, such as a furnace for sintering, and in some cases, reduction of $UO_{2.2}$ to $UO_2$. The pellets are retained on the tray and subsequently loaded directly into fuel rods to be used in the reactor core.

9 Claims, 1 Drawing Figure

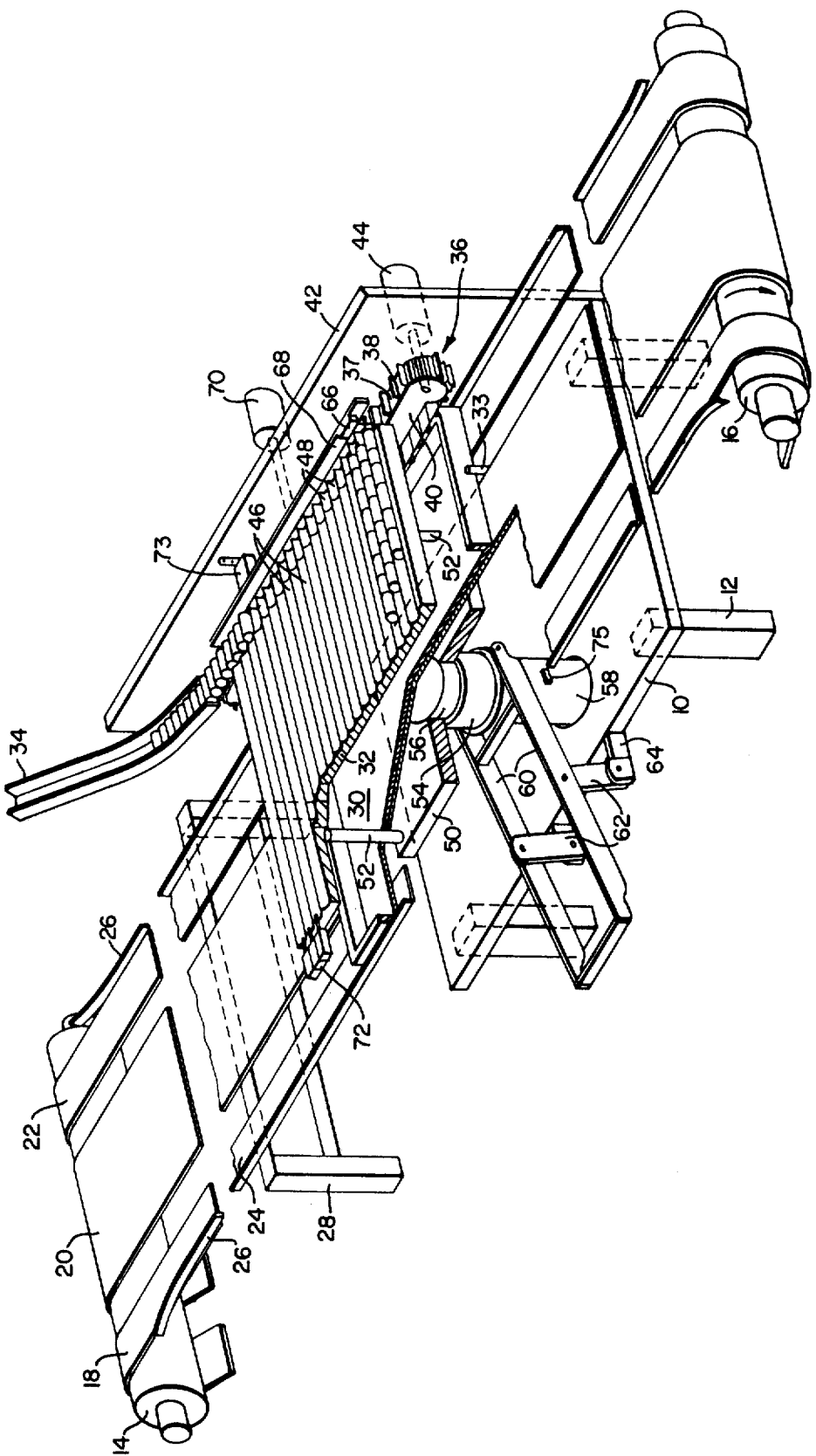

NUCLEAR FUEL PELLET LOADING MACHINE

BACKGROUND OF THE INVENTION

The invention described herein relates to nuclear reactors and more particularly to apparatus for loading nuclear fuel pellets onto trays used in a pellet transfer The fuel for nuclear reactors conventionally comprises cylindrical pellets of uranium dioxide or plutonium dioxide or a mixture of both ranging in size from about 0.3 inches to 0.8 inches long by 0.25 inches to 0.5 inches in diameter depending on the size of reactor. These pellets are loaded into fuel rods and multiple fuel rods then constitute the heat generating core of a nuclear reactor. Since about 3.5 million pellets are contained in a single conventional reactor of the type used with large electrical power generation equipment, it is obvious that automated manufacturing methods must be used to process the pellets through the pellet manufacturing and fuel rod loading operations in order to achieve efficiency in terms of manufacturing time and cost.

During the manufacturing process, uranium dioxide fuel can safely be handled manually without protective shielding, and after the fuel is fashioned to a pellet shape, the pellets are conveyed to an appropriate furnace for sintering. Currently, different manufacturers orient the pellets on trays in different ways prior to transfer to a sintering furnace. In some cases, the pellets simply are randomly positioned on a tray thus eliminating the need for pellet orientation equipment, but after sintering, the pellets still must be organized to permit efficient transfer and loading into fuel rods. In other processes, the pellets are stacked vertically, for example, by either mechanical or vacuum operating equipment before sintering. Since the pellets shrink about 20% during sintering, pellet toppling often occurs thereby requiring manual handling to either reorient the pellets or to position them in another device for further handling.

The pellet handling problem is magnified many times when the pellet fuel, such as a mixture of plutonium dioxide and uranium dioxide, is sufficiently radioactive and toxic to require the use of remote pellet handling equipment. Such pellets currently are manufactured in limited quantities and manual handling techniques are therefore justified in view of the radioactive risks and the costs involved in transferring each pellet in the manufacturing process. However, the pellets are fragile and manual handling often results in pellet chipping as they fall or forcefully contact one another while being loaded on trays during the course of transfer from one area to another. Since the chips are radioactive, they must carefully be accumulated and stored until recycled in the system or otherwise disposed of in accordance with established procedures. Plutonium is expensive as compared to other fuel materials and in view of the need to recycle both chipped pellets and chip particles, costs for doing so rise drammatically thus dictating the need for improved pellet handling apparatus and procedures to achieve greater control over pellet stability both during handling and transfer operations and for achieving consistent production of high quality products free of imperfections which occur during the manufacturing and subsequent fuel rod loading operations.

BRIEF SUMMARY OF THE INVENTION

Briefly stated, the above disadvantages are eliminated by the present invention by providing apparatus which loads fuel pellets uniformly on a tray for subsequent transfer to a sintering furnace, fuel rods or the like. The system includes a conveyor which transports pellets to a carrier which is independently movable to and from the loading area and cooperation between the conveyor and carrier and determination of pellet position is controlled by sensing devices which detect pellet and carrier position. It will occur to those skilled in the art that numerous types of pellet position detectors and conventional control systems may be used for effecting alignment of movable components and for effecting transfer of both the pellets and the carrier in accordance with a predetermined sequence of operation.

It therefore is an object of the invention to provide apparatus and a process for automatically transferring fuel pellets from a pellet source to a carrier which conveys pellets to an area for subsequent handling in the system.

Another object of the invention is to provide a machine which automatically loads nuclear fuel pellets into fixed slots on a tray which then is moved to a next station which handles or treats the pellets.

BRIEF DESCRIPTION OF THE DRAWING

The subject matter of the invention is particularly pointed out and distinctly claimed in the concluding portion of this specification. The invention, however, both as to organization and method of operation, together with objects and advantages thereof, may best be understood by reference to the following description taken in connection with the accompanying drawing in which:

FIG. 1 is a perspective view of the nuclear fuel pellet loading machine comprising the invention.

Referring now to the drawing, there is shown a base 10 on legs 12 which support the operating components of the fuel pellet loading machine. To enable a clear and complete understanding of the invention, the following disclosure is directed towards a machine used for loading green or unfired fuel pellets onto a tray type sintering boat which then transfers the fuel pellets to a sintering furnace. It is to be understood however that the apparatus is equally adaptable to other uses such as loading the fuel pellets from the boat into fuel rods which later are used in the reactor.

A pair of rollers 14 and 16 supported in bearing housings, not shown, are disposed on opposite ends of the machine and carry endless belts 18, 20, and 22. These belts move linearly on a plate 24 having guide flanges 26 attached to opposite sides of the plate. The plate 24 is supported on base 10 and a suitable support structure 28. A two part sintering boat comprising a boat base 30 and a furrowed tray 32 is moved by the belt between rollers 14 and 16.

The sintering boat comprising a square or rectangular base 30 desirably made of pure molybdenum although tungsten, for example, displays characteristics which provide equivalent performance but it is more expensive. Molybdenum and tungsten are the only known high temperature substances which reasonably can be used that do not react with uranium dioxide while still being capable of withstanding temperatures ranging upward to about 1800°C. Molybdenum is especially suitable for use because of the ability to absorb stresses and strains imparted to it while exposed to the pellet manufacturing operation. Molybdenum provides strength to the base 30 and the tray 32 desirably is made of aluminum dioxide or other comparable ceramic material capable of withstanding the high temperatures and mechanical effects which result from rapid heating and cooling and relatively rough handling.

In a preferred form, the tray 32 which fits loosely in boat base 30, measures 12 inches $l.$ × 12 inches $w.$ × ¾ inches $h$. This size tray contains about 20 parallel disposed rows which accommodate 350 pellets weighing 3.5 kilograms. Obviously, the size of tray 32 may be varied to suit particular production requirements. Likewise, substitutes for the boat and tray materials may be made providing they display the above-described characteristics.

The sintering boat including tray 32 is a removable item in the operation. It normally enters the left side of the machine at roller 14 in an empty condition and moves forwardly until stopped by alignment pin 33. The tray is then raised to an up position as shown in the drawing for receiving pellets and when the tray is full, it is lowered and the boat moved linearly on the belts towards roller 16 and into a sintering furnace, not shown.

Referring now to the pellet loading mechanism, a fuel pellet feed conveyor 34 has its inlet positioned adjacent a pellet press, now shown, which discharges pellets directly on the conveyor in a side by side arrangement with their axis lying in a horizontal plane. A timing belt feed conveyor 36 mouunted on a back plate 42 abuts conveyor 34 and is placed in alignment with conveyor 34 for receiving fuel pellets. Conveyor 36 includes an endless belt 37 having multiple outwardly directed projections 38 spaced from each other a distance sufficient to accept a single fuel pellet. The belt is suitably mounted on a frame 40 secured to back plate 42 and belt movement is accomplished by a motor 44 which likewise is attached to the plate 42. The belt may be made of metal, hard rubber or the like and the choice of materials is determined by the particular temperature environment in which the machine will be placed for operation.

When the sintering boat is moved by belts 18, 20 and 22 into a fuel pellet receiving position, it is stopped in an exact position by the alignment pin 33 mounted on base 10. The location of this alignment pin is selected such that when the sintering boat abuts the pin, the furrows 46 in tray 32 are in precise alignment with spaces 48 located between adjacent projections 38 which hold a fuel pellet during normal machine operation. In the embodiment shown, the tray 32 is adapted to be raised vertically from its position in the sintering boat base to that shown in the drawing, where the furrows 46 are in alignment with spaces 48.

To accomplish such raising and lowering of the tray, a plate 50 is immovably positioned, except for raising and lowering, on the frame 24 on which the sintering boat moves. The plate 50 is equipped with multiple upstanding rods 52 which project through openings provided in the boat base and contact the underside of the furrowed tray 32. To effect raising and lowering of the furrowed tray, a piston 54 having a reduced portion 56 projects through and is intimately connected to the plate 50. The piston is housed in a cylinder 58 and is actuated to upper and lower positions by a mechanism comprising a pair of parallel bars 60 pivoted on upstanding members 62 which in turn are secured to base 10 by supports 64. It will be apparent that downward movement of the mechanism will cause bars 60 to pivot on members 62 and thus raise the piston and its connected plate 50 in an upward direction. By doing so, the pins 52 contact the underside of furrowed tray 32 and move it into a position where the bottom of furrows 46 are in the same plane as the bottom of spaces 48 which support the fuel pellets.

Assuming the furrowed tray 32 to be in the raised position and therefore in alignment with timing belt 36, upon energization of motor 44, pellets are fed from the feed conveyor 34 into the spaces 48 provided in the timing belt 36. As the timing belt rotates the pellets will move forwardly thereon until the lead pellet contacts a sensing switch 66 mounted on mechanical push bar 68 located adjacent the timing belt. Switch 66 controls motor 44 so that as the lead pellet contacts the switch, the windings in motor 44 are deenergized and the timing belt therefore comes to a halt. At that time the pellets on the timing belt are in exact alignment with the furrows 46 and are pushed into the furrows manually by handle 70 mounted on the end of push bar 68. After the push rod moves the pellets into the inserts 46 and is retracted, the lead pellet disengages switch 66 which closes and motor 44 is again started to rotate the timing belt and thus receive an additional supply of pellets from the pellet feed conveyor 34. This process is then repeated numerous times until the pellets fill furrows 46 and contact switches 72 mounted on the end of tray 32. The switches 72 are in series with the motor 44 and normally are in a closed position. However, upon contact by the pellets, switches 72 open the circuit to motor 44 and even though the push bar 68 is in a returned position which closes switch 73 and a switch 66 is closed since a pellet is not bearing against it, the open circuit to the motor caused by open switches 72 keeps the timing belt 36 from rotating and pellets at that time will not be fed into the system. With the furrowed tray thus completely loaded, mechanism bars 60 are actuated to lower the sintering boat onto belts 18, 20 and 22 which then move the sintering boat together with the loaded furrowed tray 32 into a sintering furnace. At that time an empty boat is moved onto the belts and into a position to again load pellets onto the tray and the above-described process is then repeated.

It will be apparent to those skilled in the art that numerous modifications may be made from the spirit of the invention. For example, the raising and lowering mechanism 60 may be eliminated from the system and by machining the parts to a precise tolerance, the sintering boat may be moved into a pellet loading position adjacent the timing belt and the pellets loaded from the timing belt directly onto the furrowed tray without resorting to the raising and lowering mechanism as described above. Also, in lieu of using multiple switches 72, each being positioned in a furrow 46, a conventional photocell arrangement may be placed at an end of the furrowed tray and arranged such that it looks along the side of the tray and transversely to the furrow axis to detect the presence of pellets which would indicate that the furrows are full. With this arrangement, as a pellet projects just beyond the end of a furrow, the photocell light beam will be broken and a switch, such as 72 in series with the photocell and motor, will be opened thus precluding movement of the conveyor belt 37. Also, it is obvious that in lieu of using a manual arrangement for pushing pellets into furrows 46, a linear motor or solenoid may be connected to push bar 68 so that when it is appropriately energized, the bar will move pellets from the timing belt into the furrows.

Still another modification includes utilizing conventional stepping beams on which the sintering boat may be positioned to move the boat along the length of base 10 in lieu of belts 18, 20 and 22.

In view of the above, it will be apparent that many modifications and variations are possible in light of the above teachings. It is therefore to be understood that within the scope of the appended claims the invention may be practiced other than as specifically described.

We claim as our invention:

1. Nuclear fuel pellet loading apparatus comprising:
    a base supporting a removable carrier adapted to hold nuclear fuel pellets;
    means cooperating with said base for moving said carrier into a predetermined position on the base;
    stop means on said base engageable by said carrier for stopping movement of the carrier at said predetermined position;
    pellet feed means adjacent said base for conveying pellets from a source to a position alongside said carrier; and
    pellet push means alongside said base for transferring the pellets from the feed means onto said carrier, the arrangement being such that upon loading the carrier with pellets the means cooperating with the base moves the carrier away from said predetermined position.

2. The apparatus according to claim 1 wherein said carrier comprises a removable tray;
    furrows in said tray adapted to be aligned with said feed means, each of said furrows being of a size sufficient to accept multiple fuel pellets; and
    tray raising and lowering means mounted beneath said carrier for moving said tray into and out of position adjacent said pellet feed means.

3. The apparatus according to claim 1 wherein said pellet feed means comprises a device which supplies pellets from a source to a conveyor, said conveyor having slots therein which receive and hold said pellets, said slots and pellets have their axis transverse to the axis of said conveyor.

4. The apparatus according to claim 1, wherein said pellet feed means comprises a device adapted to move fuel pellets from said source along the length thereof;
    a timing belt feed conveyor having its pellet inlet end located adjacent the discharge end of said device;
    said timing belt feed conveyor including drive means coupled to a driven component having slots therein of a size sufficient to receive separate fuel pellets; and
    means associated with said component for aligning the fuel pellets thereon with furrows on the surface of said carrier to thereby allow the push means to move said pellets from the component onto said carrier.

5. The apparatus according to claim 4 wherein said driven component includes an endless belt having outwardly directed projections thereon which define said slots and are spaced a distance sufficient to receive said pellets; and
    said drive means connected to said endless belt rotates said belt to move said pellets into a position for loading onto said carrier.

6. The apparatus according to claim 1 wherein said pellet push means comprises a longitudinally extending bar positioned outwardly of said feed means and in transverse alignment therewith so that as the bar is pushed inwardly, the surface thereof engages said pellets and pushes them onto said carrier.

7. The apparatus according to claim 5 wherein a slot position sensing switch is mounted adjacent said timing belt feed conveyor and in a position to be contacted by a first pellet fed onto said driven component, said switch being connected to said drive means and effective to stop said conveyor when the switch-drive means circuit is opened by said first pellet.

8. The apparatus according to claim 7 wherein pellet position switch means is mounted adjacent said carrier and in alignment with said furrows for sensing when said furrows are fully loaded with pellets; and
    a circuit connecting said pellet position switch means with said drive means to stop movement of said belt conveyor.

9. The apparatus according to claim 3 including a pellet position detector mounted on a support for the conveyor and located in the path of the pellets conveyed to a position alongside the carrier.

* * * * *